Figure 1:
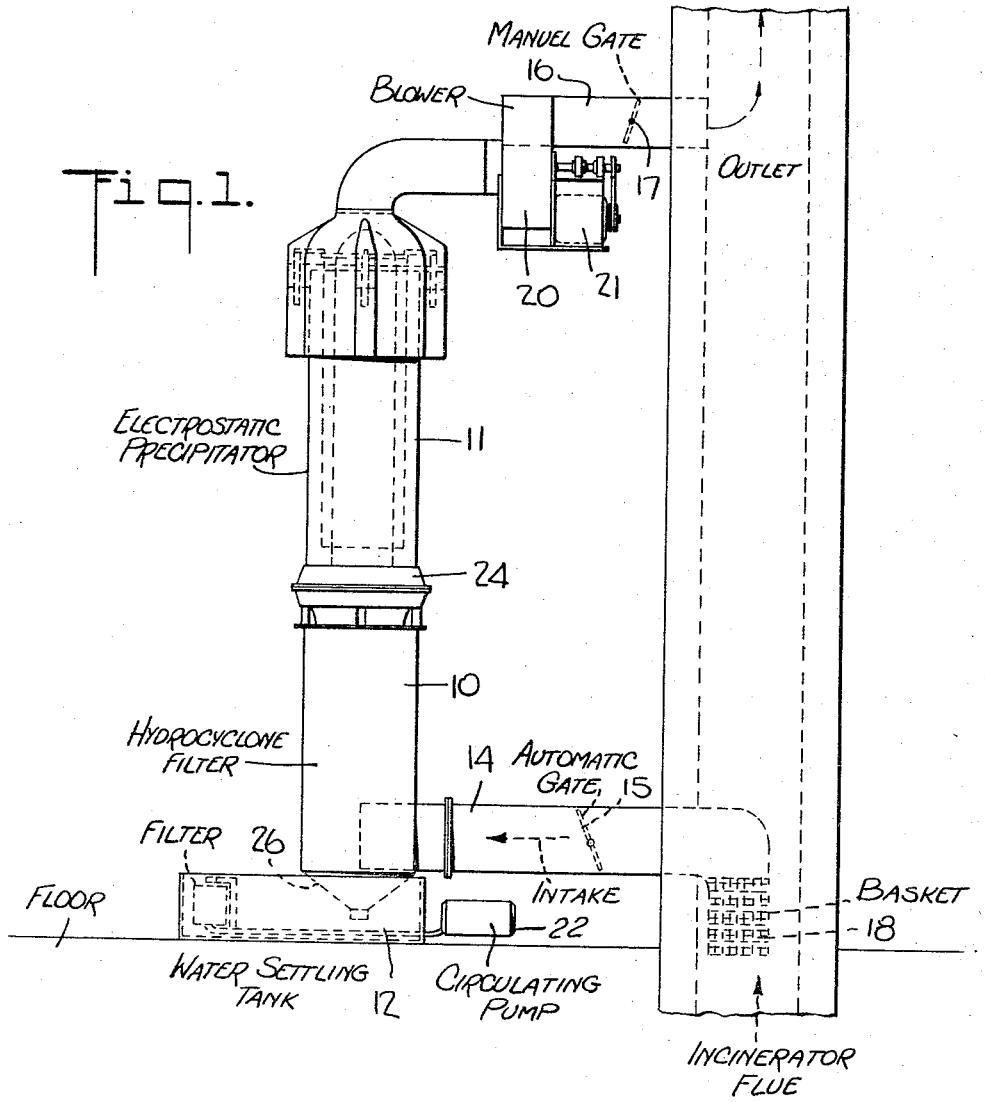

INVENTOR.
ALEXANDER P. DE SEVERSKY
BY
ATTORNEY

April 25, 1967 A. P. DE SEVERSKY 3,315,444
INTEGRATED MECHANICAL FILTER AND ELECTROSTATIC
PRECIPITATOR SYSTEM FOR BROAD
SPECTRUM PURIFICATION
Filed May 1, 1964
2 Sheets-Sheet 2
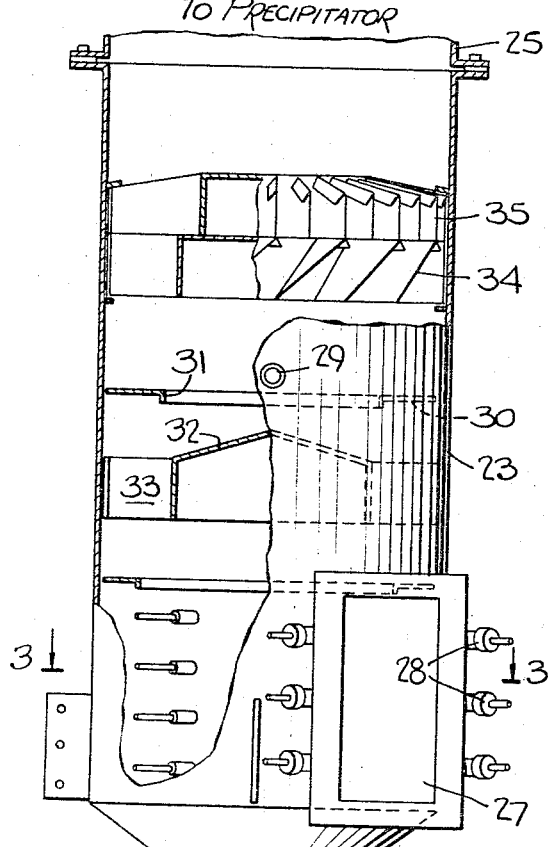
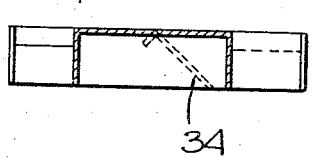
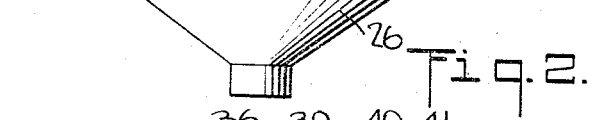
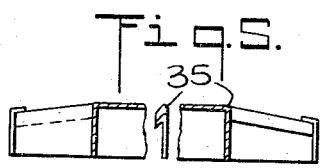
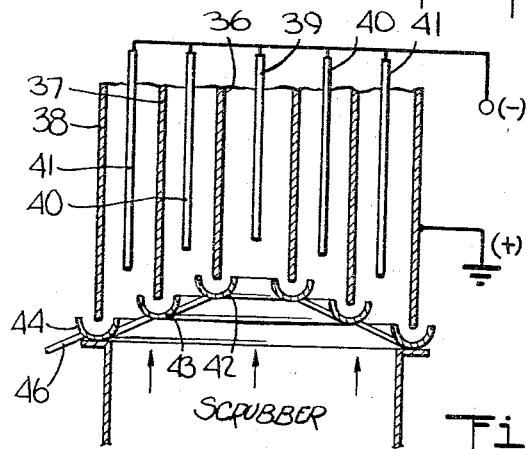
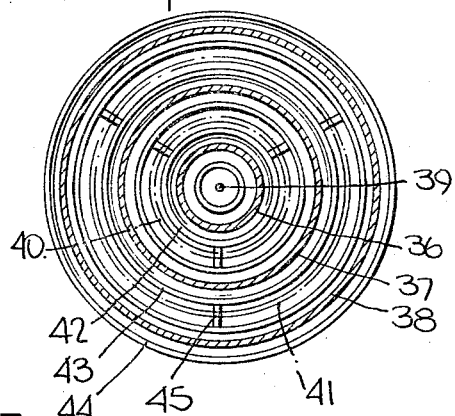
INVENTOR.
ALEXANDER P. DE SEVERSKY
BY
ATTORNEY

United States Patent Office 3,315,444
Patented Apr. 25, 1967

3,315,444
INTEGRATED MECHANICAL FILTER AND
ELECTROSTATIC PRECIPITATOR SYSTEM
FOR BROAD SPECTRUM PURIFICATION
Alexander P. de Seversky, Northport, N.Y., assignor to
Electronatom Corporation, New York, N.Y., a corporation of New York
Filed May 1, 1964, Ser. No. 364,143
5 Claims. (Cl. 55—122)

My invention relates generally to a purifying system for separating particles of a solid or semi-solid nature as well as toxic components from air or other gaseous media, and more particularly to an integrated precipitator system which combines hydrodynamic and electrostatic sections to produce a synergetic action for effectively removing all impurities, whether of large or small particle size or in semi-solid or gaseous form, from the contaminated medium.

The rise in atmospheric pollution in industrial centers and in heavily populated cities has become a matter of grave concern throughout the world. In large metropolitan areas, a heavy volume of pollutants is discharged into the atmosphere by factories, power stations, hotels, apartment houses, and other industrial and non-industrial facilities which make use of heating systems, chemical processing equipment, incinerators, and other devices emitting combustion and waste products.

For purposes of reducing pollution, it is known to use electrostatic precipitators wherein impurity-laden gases, such as those issuing from a heating furnace, incinerator or an industrial outlet, are conveyed through a charged enclosure where they are subjected to an electrostatic field ionizing the particles and causing their migration from a discharge electrode to a collecting electrode which may be flat or tubular, thereby extracting the particles from the gas stream. With continued use, the particles accumulate on the surface of the collector electrode and on other exposed surfaces. It is therefore necessary at frequent intervals to decontaminate the structure. This requires a shut-down of precipitator operation in order to permit scraping of the agglomerated particles from the surfaces, or the use of vibratory cleaning, rapping or flushing. Thus the conventional electrostatic installation cannot function uninterruptedly and must be serviced at frequent intervals.

In my prior Patents 2,937,709 and 3,053,029, and in my copending applications entitled, "Wet Electrostatic Precipitator," (Ser. No. 53,255, filed Aug. 31, 1960) and "Self-Decontaminating Electrostatic Precipitator Structures" (Ser. No. 222,009, filed Sept. 2, 1962, now Patent No. 3,238,702), there are disclosed wet electrostatic precipitators wherein the collecting surfaces are constituted by uniform films of water which carry away the particles. Precipitators of the type disclosed in my patents and pending applications are to a large extent inherently self-cleaning. Being maintenance-free, they are particularly suited for precipitating complex particulate matter of the type encountered in some chemical plants, in apartment houses and municipal incinerators. They also may be advantageously used for extracting radioactive particles from the atmosphere in the case of fall-out, for these particles are carried away by the collecting liquid which may be safely stored or decontaminated.

It is also known to use mechanical filters, such as wetted beds, cyclones and scrubbers to remove contaminants from a gas stream. In scrubbers, which are the most effective form of such filters, the scrubbing action is one where a liquid, generally water, is brought into contact with the gas. Scrubbing usually is carried out in a tower through which the impure gas is made to flow in countercurrent relation with respect to the water. Scrubbing equipment commercially available includes rain-type and spray scrubbers, as well as hurdle scrubbers made up of a maze of staggered slots which are wetted to cause the dust impinging thereon to be retained by the water film. In order to remove fine particulates, that is, those of a size less than 10 microns, as well as larger particles, scrubbers are sometimes provided with perforated plates or fine screens. However, such scrubbers are effective only for a relatively brief period, for the plates or screens tend to clog and impede the passage of the medium being decontaminated.

On the other hand, electrostatic precipitators of the conventional dry or wet type or of the improved wet type disclosed in my patents and copending applications, are more effective when separating fine particles suspended in air or gas streams. While larger particles are also ionized, their momentum is so great that they tend to be carired out by the gas stream before reaching the collector surfaces.

Accordingly, it is the main object of this invention to provide an integrated system for minimizing pollution which synergetically combines a mechanical filter such as a scrubber, with an electrostatic precipitator wherein the mechanical cleansing action of the filter in removing coarse particles is rendered compatible with that of the precipitator in removing fine particles, and the flow of the gaseous stream through both filter and precipitator is aerodynamically reconciled, whereby the resultant system attains optimum efficiency and functions to extract the full spectrum of contaminants from the stream.

Should scrubbers and electrostatic precipitators be connected in series, elaborate duct work would be necessary to convey the impure gas through the scrubber and then through the electrostatic precipitator. Such arrangements would not only be costly and cumbersome, but they would be inherently less inefficient. In the scrubbing operation, in order to thoroughly intermingle the water and gas, the flow of gas is rendered turbulent, and hence emerges from the scrubber in a stream whose velocity varies throughout its cross-section. On the other hand, to operate the electrostatic precipitator with greatest efficiency, it is vital that the incoming gas stream have a laminar flow characteristic and a uniform velocity profile. Hence the gas flow disturbances introduced in cyclonic or other turbulent scrubbing actions, militate against effective electrostatic precipitation.

Thus another important object of my invention is to provide a unitized system which integrates mechanical filtration and electrostatic precipitation sub-assemblies into an efficient and compact structure, thereby obviating the need for duct work therebetween, the system being capable of operating reliably for prolonged periods without attention.

A significant feature of the invention resides in the fact that while the gas passing through a hydrodynamic section is subjected to a cyclonic scrubbing action, it emerges therefrom in collimated, non-turbulent form and enters the gas passages of the electrostatic section with a uniform velocity profile, thereby optimizing the aerodynamic coupling between the two sections. The hydrodynamic section is of the open type and offers little obstruction to the passage of finer particles, so that its effective range of filtration begins at about 10 microns and extends to the larger particle sizes. The electrostatic precipitator section is mated to the hydrodynamic section, for its effective range of filtration levels off at about 10 microns. Hence the filtration curves of the two sections cross over at about 10 microns and thereby act synergetically to cover the full spectrum of pollutants.

Also an object of the invention is to provide an integrated system of the above type having a common water supply for feeding water into intercoupled hydrodynamic and wet electrostatic precipitator sections, as well as a common blower for drawing the contaminated gas serially through the two sections.

Still another object of the invention is to provide an integrated system wherein the electrostatic precipitator section is mounted directly above a scrubbing section, the electrostatic section being constituted by at least one annular gas passage formed by a collector tube whose wall is washed, the combination being highly efficient and compact.

Because the integrated system in accordance with the invention is composed of a non-clogging scrubber section and a matching wet precipitator section which is self-cleaning and does not foul, very little maintenance is required and the compact, integrated structure may be installed on the roof of a building to eliminate substantially all smoke and particulates from flue gases at the exhaust. This advantage of the system is of considerable economic value, for a high degree of efficiency can be achieved at low cost on all existing buildings without modifications, alterations or other disturbances to the existing incineration or other pollution producing installations. Moreover, chimney stacks can now be made at lower heights, since the level of purification attained by the integrated system in accordance with the invention does away with the nee dto discharge noxious effluents at great elevations by means of high stacks.

Briefly stated, these objects are accomplished in an integrated synergetic system constituted by a wet electrostatic precipitator section mounted above a hydrodynamic precipitator section to form a unitary tower in which coarse particles and fine particles are selectively extracted, contaminated gas being admitted at the base of the tower into the hydrodynamic section and being blown therethrough directly into the electrostatic section. An air flow converter is interposed between the two sections to provide an aerodynamic coupling device to transform the turbulent streams emerging from the hydrodynamic section into a stream having a vertical laminar flow with a uniform velocity profile, which stream after being processed electrostatically, emerges in purified form from the top of the tower. Another important aspect of the invention resides in the fact that the aerodynamic flow converter is designed to alter the flow direction in a manner eliminating mist. This prevents droplets of solid liquid from entering the precipitator and interfering with the proper operation thereof.

Figure 2:
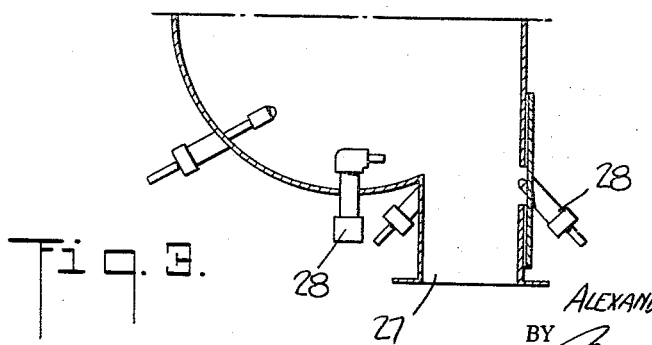

For a better understanding of the invention, as well as other objects and further features thereof, reference is made to the following detailed description to be read in conjunction with the accompanying drawings, wherein:

FIG. 1 schematically illustrates a unitized system formed by synergetically related hydrodynamic and electrostatic precipitator sections in accordance with the invention, the system being operatively shown in conjunction with an incinerator flue;

FIG. 2 separately shows the hydrodynamic section which is partly cut away to reveal the components therein;

FIG. 3 is a transverse section taken in the plane indicated by the lines 3—3 in FIG. 2;

FIG. 4 separately shows one baffle of the aerodynamic assembly in the hydrodynamic section;

FIG. 5 separately shows another baffle of the aerodynamic assembly;

FIG. 6 shows in section the lower portion of a preferred concentric type of electrostatic precipitator; and FIG. 7 is a plan view of the concentric arrangement.

Referring now to the drawings, and more particularly to FIG. 1, there is shown a unitized hydrodynamic-electrostatic precipitator system in accordance with the invention, comprising a hydrocyclonic filter section or scrubber, generally designated by numeral 10, intercoupled synergetically with an electrostatic wet precipitator section 11. The two sections or sub-assemblies are mounted vertically, one above the other, over a water settling tank 12 which rests on the floor. The two sections are joined together by a coupling collar 24 to form a unitary tower.

By way of example, the system is shown operating in conjunction with an incinerator whose combustion products are discharged into the atmosphere through a vertical flue 13. It is to be understood that the system is usable in conjunction with any source generating a contaminated gaseous medium. It will also be appreciated that by combining the two sections into a compact tower structure in the manner shown, there results an over-all economy in space and elimination of all interconnecting duct work. This makes it possible to install the system in relatively confined quarters.

The impurity-laden incinerator gas is drawn at high velocity into the precipitator system at the bottom of the tower by means of an intake duct 14 provided with a gate 15. The impurity-free gas derived from the top of the tower is returned to the flue through an outlet duct 16 having a gate 17. Since the gas is no longer polluting, it may in practice be discharged directly in the atmosphere and there is no need for a high stack to disperse the pollutants. A tubular filter grid 18 is mounted within the flue at the entrance to the intake duct 14 to prevent the admission of exceptionally large particles.

The gas is conducted through the system by means of a blower 20 interposed in the outlet duct 16 and driven by a motor 21. Filtered water is circulated by a pump 22 through both the electrostatic and hydrodynamic sections of the system, the water-borne impurities being discharged into the tank 12.

In operation, when the inlet and outlet gates are open, the impurity-laden gas emitted by the incerator is first conveyed upwardly through the hydrodynamic section 10 where it is so intermingled with the water stream therein, whereby relatively large particles are removed, the gas continuing upwardly through the electrostatic precipitator section 11, where finer solid and semi-solid particles are precipitated, the clean gas then being returned to the flue where it is discharged into the atmosphere without creating pollution. The velocity of gas flow produced by the blower is such that when the blower is driven, substantially all of the flue gas is by-passed into the unitized precipitator system.

Referring now to FIGS. 2 and 3, the structure of the hydrodynamic precipitator section 10 is shown in greater detail, this section comprising a cylindrical casing 23 whose upper end is bolted to the lower end of the casing 25 of the electrostatic section, the lower end of casing 23 terminating in a funnel 26 which dumps the contaminated water into the tank. The inlet duct 14 is connected to a lateral inlet port 27, adjacent the lower end of the casing. The incoming impurity-laden gas is introduced tangentially into the casing and is subjected to high-velocity water jets projected from an array of jet nozzles 28, thereby dynamically intermingling the gas with the water with a high degree of turbulence in order to entrap the larger particles and effect their precipitation. A considerable amount of toxic gases resulting from combustion are also absorbed in the water.

Water is also introduced through a pipe 29 at an intermediate level in the hydrodynamic precipitator section 10, the water swirling about an annular shelf 30 provided with a weir ring 31 causing the downwardly-flowing water to impinge on conically-domed and vaned baffle 32 which directs the water into an annular passage 33 surrounding the dome.

Because of the manner in which the gas in introduced into the hydrodynamic precipitator and the manner in which water jets are directed tangentially onto the gas, a cyclonic motion is imparted to the upwardly drawn gas as it travels through the annular passage 33 and through the opening in shelf 30. This cyclonic motion enhances the scrubbing interaction between the water and the gas. It will be noted that the scrubber of hydrodynamic precipitator is basically of the open type, for there are no fine screens or foraminated plates included to entrap fine particles. Such screens tend to foul and in time to clog the scrubber so that periodic cleaning becomes necessary. However, with the open type, no servicing is necessary.

Before the gas enters the electrostatic precipitator, it is necessary for reasons of operating efficiency, to transform the flow pattern thereof from a cyclonic or turbulent motion having an uneven velocity profile, to a collimated or straight-line laminar flow having a uniform velocity profile. This is accomplished by an aerodynamic air flow converter formed by two sets of stators 34 and 35 placed one above the other at the upper end of the structure to provide a double deck arrangement.

Stator 34 is composed of an array of vanes which are inclined relative to the vertical axis of the hydrodynamic precipitator, whereas stator 35 is composed of an array of vanes which are in alignment with the vertical axis. The upper ends of the vanes in both stators are bent over or hooked to provide traps for collecting mist, thereby preventing droplets or liquid-encased particles from entering the electrostatic precipitator.

In practice, the air flow converter which is shown as a double deck structure may be multi-decked in order to chang the direction of air flow several times and thereby entirely eliminate mist.

Thus in operation, the gas stream to which a cyclonic motion has been imparted in the lower end of the precipitator, is drawn through the two sets of stators forming the aerodynamic flow converter, and is divided into laminae extending in planes parallel to the vertical axis. The lower set of vanes acts to disrupt the cyclonic flow pattern, whereas the upper set causes the gas stream to assume the desired uniform velocity pattern. In practice, the vanes may be curved instead of flat to avoid frictional corners and to bring about a smoother transition in the flow pattern transformation.

The electrostatic precipitator 11 is preferably of the type disclosed in my copending applications, and comprises outer and inner collector tubes coaxially arranged to define an annular gas channel within which is concentrically disposed a circular discharge electrode. Water is caused to flow down the walls of the collector tubes lining the gas channel, and an electrostatic field is set up between the electrode and the water films, whereby particles precipitated therein are washed down the walls.

Another preferred form of electrostatic collector tube arrangement is shown in FIGS. 6 and 7, wherein the collector tubes 36, 37 and 38 are provided in a concentric arrangement, with a rod-like discharge electrode 39 disposed centrally within the inner tube 36, a grid-like tubular discharge electrode 40 formed by a circular array of wires being disposed concentrically between tubes 36 and 37 and a similar discharge electrode between tubes 37 and 38. A high voltage is applied between the discharge electrodes 39, 40, and 41, and a water film on the inner walls of collector tubes 36, 67 and 38, to form an electrostatic field in the air passages therebetween. The water films on the collector tubes may be produced by means similar to that shown in my prior patents and co-pending applications above-identified. Thus electrostatic precipitation occurs in three concentric gas channels, the first being within tube 36, the second being between tubes 36 and 37, and the third between tubes 37 and 38, the particles migrating from the discharge electrodes toward the collector surfaces.

Tubes 36, 37 and 38 are of progressively different length. Below tube 36 is a circular trough 42 to collect the water therefrom, while below tube 37 is a circular trough 43, and below tube 38, a circular trough 44, the three troughs being at different levels. The troughs are emptied by the downwardly-inclined interconnecting pipes 45 which provide a gravity flow system from trough to trough, the water accumulating in the lowermost trough 44 being emptied through waste pipe 46.

Thus the lamina-flow of partially cleaned gas emerging from the hydrodynamic filter or scrubber is continued through the concentric gas passages in the electrostatic precipitator, where the remaining fine particles are removed.

The particle extraction response of the hydrodynamic precipitator section 10 begins effectively with particles above 10 microns in size and continues into the large-particle range. The particle extraction response of the electrostatic precipitator is effective up to about 10 microns, the response thereafter tapering off. Thus the response curves cross over at about 10 microns, and the combination of sections functions cooperatively to cover the full range of particles.

While there have been shown preferred embodiments of an integrated mechanical filter and electrostatic precipitator system in accordance with the invention, it will be appreciated that many changes and modifications may be made therein without, however, departing from the essential spirit of the invention as defined in the annexed claims.

What is claimed is:

1. An integrated system for removing both fine and coarse particles from a contaminated gaseous medium, said system comprising:
   A. a hydrodynamic section for extracting coarse particles from said contaminated gaseous medium and including,
      (a) a chamber having an input and an output,
      (b) means introducing said contaminated gaseous medium into said input to produce a cyclonic motion of said medium in said chamber, and
      (c) means subjecting the gaseous medium in said chamber to high-velocity jets of water to effect intermingling of said water and said medium to entrap said coarse particles and causing said medium to emerge from the output of said chamber in a wet, turbulent state,
   B. an electrostatic precipitator section for extracting fine particles from said medium and including,
      (a) collector and discharge electrodes disposed in spaced relation to define a flow passage therebetween having an input and an output,
      (b) means to apply a high voltage between said collector and discharge electrodes to produce an electrostatic field therebetween extending transversely with respect to the longitudinal axis of said flow passage, and
   C. an aerodynamic flow converter section coupling the output of said chamber to the input of said flow passage, and including,
      (a) an array of vanes defining a plurality of substantially unobstructed conduits dividing the wet, turbulent gaseous medium emerging from the output of said chamber into laminae extending in planes parallel to the longitudinal axis of said flow passage causing said medium entering said flow passage to assume a laminar form whereby electrostatic precipitation is effected therein with optimum efficiency and said medium passes out of the output of said flow passage in decontaminated form, and
      (b) means to eliminate mist from said wet, turbulent medium to cause said medium to enter the input of said flow passage in a relatively dry condition to minimize deleterious arcing in said electrostatic field.

2. A system as set forth in claim 1, further including a unitary tower for containing said sections in stacked relation, said hydrodynamic section being mounted at the bottom of the tower, said electrostatic precipitator section being mounted at the top of said tower, and said aerodynamic flow converter section being interposed therebetween.

3. A system as set forth in claim 2, further including blower means causing the medium introduced into the input of said chamber at the bottom of the tower to pass through said sections and to issue in decontaminated form from the top of the tower.

4. A system as set forth in claim 2, wherein said means to eliminate mist is constituted by bent-over portions of said vanes to entrap mist in the gaseous medium flowing through said conduits.

5. A system as set forth in claim 1, including a second array of vanes disposed between the output of said chamber and the first array thereof, the vanes in the second array being inclined relative to the vanes in the first array.

References Cited by the Examiner
UNITED STATES PATENTS

| 2,273,194 | 2/1942 | Hedberg et al. | 55—8 |
| 2,587,416 | 2/1952 | Vedder | 55—416 X |
| 2,639,781 | 5/1953 | Savitz | 55—138 X |
| 2,740,493 | 4/1956 | Wintermute | 55—122 X |
| 2,756,842 | 7/1956 | Chamberlin et al. | 55—8 |
| 2,937,709 | 5/1960 | De Seversky | 55—119 |
| 3,149,936 | 9/1964 | Rich | 55—114 |

HARRY B. THORNTON, *Primary Examiner.*
ROBERT F. BURNETT, *Examiner.*